A. COPONY.
DECKING APPARATUS.
APPLICATION FILED FEB. 27, 1919.

1,336,201. Patented Apr. 6, 1920.

Inventor
Alfred Copony

By Whittemore, Hulbert, and Whittemore
Attorneys

UNITED STATES PATENT OFFICE.

ALFRED COPONY, OF DETROIT, MICHIGAN, ASSIGNOR TO COPONY AUTO-LOADING COMPANY, OF DETROIT, MICHIGAN, A CORPORATION OF MICHIGAN.

DECKING APPARATUS.

1,336,201.  
Specification of Letters Patent.  
Patented Apr. 6, 1920.

Application filed February 27, 1919. Serial No. 279,656

*To all whom it may concern:*

Be it known that I, ALFRED COPONY, a citizen of Austria, having taken out first United States citizenship papers, residing at Detroit, in the county of Wayne and State of Michigan, have invented certain new and useful Improvements in Decking Apparatus, of which the following is a specification, reference being had therein to the accompanying drawings.

This invention relates to decking systems for loading automobiles or the like and refers more particularly to a simplified arrangement for decking automobiles, one above the other, in freight cars of usual construction, said arrangement being an improvement upon the disclosure of applicant's Patent No. 1,254,312, issued January 22, 1918. In common with the construction disclosed in said issued patent, the invention seeks to provide a construction which will support an automobile adjacent the top of a car so as to allow a sufficient under-lying space for placing a second vehicle; to provide a construction which will have an effective bracing and in which the axle members of the supported automobile are so positioned with reference to the brace members as to transmit the stresses longitudinally of the brace members; and to provide a construction which can be made from the standard sizes of lumber, if desired.

Furthermore, the invention has for its object the provision of improved connecting means both between the brace members comprising the vehicle supporting frame and between said brace members and the walls of a freight car.

Figure 1:
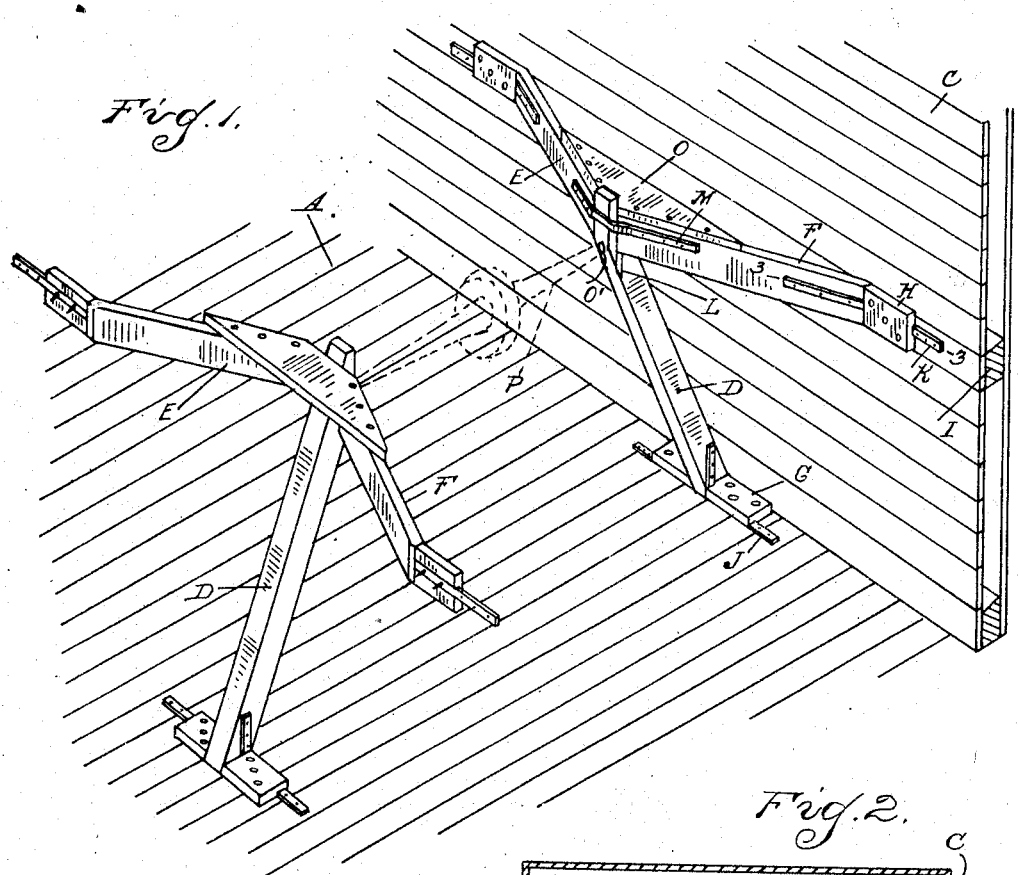
Figure 1 is a perspective view of two of the supporting frames showing in dash line the engaged axle of a motor vehicle.
Figure 2:
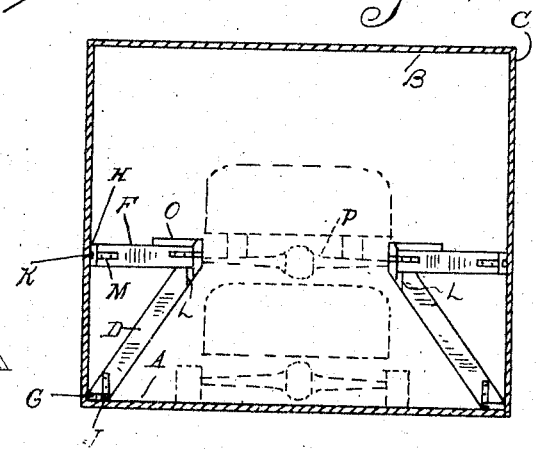
Fig. 2 is a vertical transverse section through a freight car to which the invention is applied.
Figure 3:
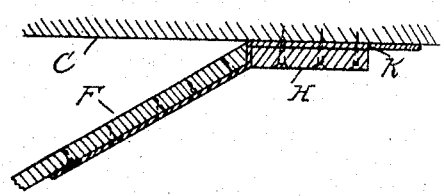
Fig. 3 is a cross sectional view on the line 3—3 of Fig. 1.

Describing in detail the particular embodiment of my invention shown in the drawings, A designates the floor of a freight car, B the top and C the sides thereof. In the shipping of motor vehicles it is desirable to double deck the same, if possible, that is, to store one of the vehicles above the other so that in a space normally receiving only three or four of the vehicles it becomes possible, by use of the invention, to conveniently carry twice that number.

In detail, the invention comprises a supporting frame consisting of three brace members, said frames being used in pairs and being adapted to engage the axles of the supported motor vehicle, one pair of frames for each axle. Each frame comprises primarily the three brace members D, E and F, the member D having a footing in the angle formed at the intersection of the floor and side wall of a freight car and being extended upwardly at an inclination to said wall while the members E and F extend horizontally from the upper end of the member D at each side thereof to the adjacent side wall of the car at an inclination to said wall. The foot of the member D is engaged between a pair of blocks G which are nailed or otherwise secured to the car floor, said member being thus held at its foot from motion longitudinally of the car. Each of the members E and F abuts agaist a block H nailed to the side wall of the car. These blocks may, if desired, be located in registration with the belt rail I so that the nails or other securing means may engage the belt rail. Certain of the nails or other securing means which fasten the blocks G to the car floor may be driven through a metal strap or tie member J, one of which underlies each of said blocks and has a portion extending upward between the block and the brace member D and nailed to the adjacent face of said brace member. Similarly, a metal strap or tie member K is engaged between each block H and the car wall, certain of the nails fastening said blocks in place preferably passing through said strap, said strap being extended out from the wall between the block and the abutting end of the adjacent brace member E or F and being nailed to the outer surface of said brace member. The adjacent ends of the two brace members E and F are set into vertical channels L oppositely formed in the upper end of the member D, as clearly shown in Fig. 1, said channels providing shoulders which transmit the stresses from the member D to the members E and F. A metal strap or tie member M is extended across the outer face of the member D at the top thereof and has its end portions respectively nailed to the outer faces of the members E and F. The frame is completed by nailing a cleat O across the members E and F, the same being secured preferably to the upper edges of said members. The member D of each pair of frames is formed in its top portion with an opening O', the openings O' of opposed members D respectively receiving the extremities of a motor vehicle axle P, the latter being shown in dash lines in the drawing.

As compared with frames hitherto employed for a similar purpose, the above described construction is more simple, less expensive, may be more easily assembled and is more secure both as regards the connections of the brace members to each other and to the walls and floor of a freight car. By providing shoulders upon the member D furnishing abutments for the outer ends of the members E and F, there is a direct transmission of stresses from the former member to the latter, the resultant construction being stronger and more easily put together than is possible where a nailed connection is used.

What I claim as my invention is:

1. In a decking system for automobiles or the like in freight cars, the combination with a brace member extending diagonally upward from the floor of the car and inwardly with respect to the side thereof, said member being laterally formed with a shoulder, of a transverse brace member coöperating with the first-mentioned brace member and having an abutment against said shoulder.

2. In a decking system for automobiles or the like in freight cars, the combination with a brace member extending diagonally upward from the floor of the car and inwardly with respect to the side thereof, said member being laterally formed with a substantially vertical channel, of a transverse brace member coöperating with the first-mentioned brace member and having an extremity let into said channel.

3. In a decking system for automobiles or the like in freight cars, the combination with a brace member extending from a floor of a car at an inclination thereto, of an abutment for said brace member secured to said floor, and a tie member having portions extended upon and secured to said abutment and brace member.

4. In a decking system for automobiles or the like in freight cars, the combination with a brace member extending diagonally upward from the floor of the car and inwardly with respect to the side thereof, of a pair of transverse brace members oppositely engaging the upper end of the first-mentioned brace member and extending to the side of the car at an inclination thereto, and a tie member having its end portions secured to the transverse brace members and having an intermediate portion engaging the first-mentioned brace member.

5. In a decking system for automobiles or the like in freight cars, the combination with a brace member extending diagonally upward from the floor of the car and inwardly with respect to the side thereof, of transverse members engaging the upper ends of the first-mentioned brace member at each side thereof and abutting against shoulders formed thereon, and a tie member extending across the first-mentioned brace member and having portions secured respectively to the transverse brace members.

6. In a supporting frame for automobiles or the like, a brace member abutting at one end against a wall, a block secured to said wall adjacent said brace member, and a tie member having a portion engaged beneath said block, and a portion extended between the block and the brace member and secured to the brace member.

7. In a frame for supporting automobiles or the like, a brace member, a block providing an abutment for said brace member, a tie member extending beneath said block and having a portion extending between the block and brace member and secured to the brace member, and a common means for securing said block in position and for securing the under-lying portion of said tie member.

8. In a decking system for automobiles or the like in freight cars, the combination with a brace member and a member providing an abutment for one end thereof, of securing means for said abutment, and a tie member having portions extended upon and secured to said abutment and brace member and having an intermediate portion engaged between said brace member and abutment.

In testimony whereof I affix my signature.

ALFRED COPONY.